US008647520B2

(12) United States Patent
Strömberg

(10) Patent No.: US 8,647,520 B2
(45) Date of Patent: Feb. 11, 2014

(54) RESTORING OF STRENGTH AND WEAR RESISTANCE OF A METAL MATRIX COMPOSITE (MMC)

(75) Inventor: Håkan Strömberg, Eskilstuna (SE)

(73) Assignee: SAAB AB, Linköping (SE)

( * ) Notice: Subject to any disclaimer, the term of this patent is extended or adjusted under 35 U.S.C. 154(b) by 728 days.

(21) Appl. No.: 12/635,332

(22) Filed: Dec. 10, 2009

(65) Prior Publication Data

US 2010/0206843 A1 Aug. 19, 2010

(30) Foreign Application Priority Data

Dec. 17, 2008 (EP) .................................... 08445035

(51) Int. Cl.

*B23P 15/00* (2006.01)
*C03C 25/00* (2006.01)
*C23F 1/00* (2006.01)
*C03C 25/68* (2006.01)
*C25F 3/00* (2006.01)

(52) U.S. Cl.

USPC ............................................ 216/39; 216/100

(58) Field of Classification Search

USPC ........................................................ 216/53
See application file for complete search history.

(56) References Cited

U.S. PATENT DOCUMENTS

| | | | | |
|---|---|---|---|---|
| 5,248,079 | A | 9/1993 | Li | |
| 5,972,424 | A * | 10/1999 | Draghi et al. | 427/142 |
| 6,384,365 | B1 * | 5/2002 | Seth et al. | 219/76.13 |
| 2002/0130164 | A1 * | 9/2002 | Matsuki et al. | 228/206 |
| 2005/0268517 | A1 | 12/2005 | Withers et al. | |
| 2007/0170150 | A1 * | 7/2007 | Bostanjoglo et al. | 216/62 |
| 2007/0274855 | A1 * | 11/2007 | Nilsson et al. | 420/38 |
| 2008/0121623 | A1 * | 5/2008 | Brooks | 216/101 |
| 2008/0229567 | A1 * | 9/2008 | Bublath et al. | 29/402.11 |
| 2009/0308123 | A1 * | 12/2009 | Stonitsch et al. | 72/53 |
| 2009/0313823 | A1 * | 12/2009 | Rockstroh et al. | 29/889.1 |

FOREIGN PATENT DOCUMENTS

WO WO-92/00939 A2 1/1992

* cited by examiner

*Primary Examiner* — Binh X Tran
*Assistant Examiner* — Thomas Pham
(74) *Attorney, Agent, or Firm* — Novak Druce Connolly Bove + Quigg LLP

(57) ABSTRACT

The present invention relates to a method and an arrangement for restoring strength and wear resistant of a metallic matrix ceramic (1) comprising a metallic binder (2) and ceramic filler (3) particles, which metallic matrix ceramic (1) has been exposed for long term high temperature and pressure cycling, for example in a gas exhaust nozzle (6), whereby micro cracks (4) are developed in the outer layer (5) of the metallic binder (2) According to the invention this is achieved by virtue of the fact that the outer layer (5) of the metallic binder (2), partly or fully, is removed from the MMC part (1) by a chemical operation, where after the outer layer (5) is compressed by a compression operation for achieving a dense outer layer (5), in which filler (3) particles are close to each other.

7 Claims, 2 Drawing Sheets

RESTORING OF STRENGTH AND WEAR RESISTANCE OF A METAL MATRIX COMPOSITE (MMC)

CROSS REFERENCE TO RELATED APPLICATIONS

Figure 1:
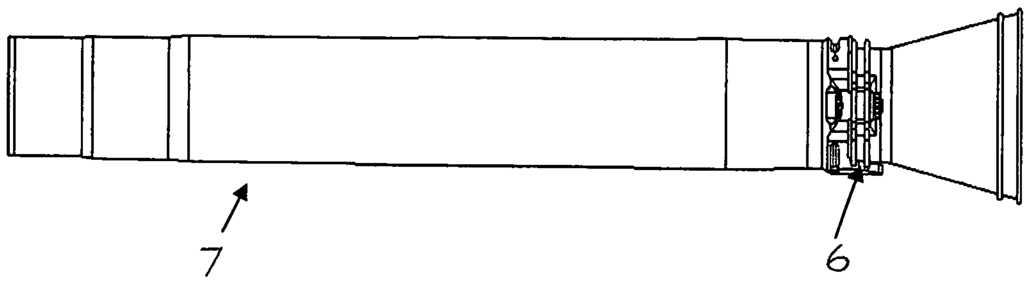

This application claims priority to EP 08445035.2 filed Dec. 17, 2008, the entire content of which is hereby incorporated by reference.

The invention relates to a method for restoring strength and wear resistant of a metallic matrix ceramic (MMC) comprising a metallic binder and ceramic filler particles, which metallic matrix ceramic has been exposed for long term high temperature and pressure cycling, for example in a gas exhaust nozzle, whereby micro cracks are developed in the outer layer of the metallic binder. The invention also relates to an arrangement for restoring strength and wear resistant of MMC.

PROBLEM DEFINITION AND BACKGROUND OF THE INVENTION

Metal matrix composite (MMC) have found application in many areas after being developed, 50 years ago. MMC was primarily, developed for rough applications, such as for space and for rocket applications. Typical requirement are; high temperature capability, high thermal conductivity, low coefficient of thermal expansion, and high specific stiffness and strength.

MMC, consist of a metallic binder and a ceramic filler. Metallic binders provide high thermal conductivity and toughness to the MMC and the ceramic filler provide strength, hardness and wear resistance to the MMC.

MMC can be produced by many different techniques, melting metallurgical processes, powder metallurgical processes and hot isostatic pressing. By altering the manufacturing method, the processing and the finishing, as well as by the form of the reinforcement components, it is possible to obtain different characteristics, although the same composition and amounts of the components are involved.

A common type of MMC consists of aluminium as binder and silicon-carbide as filler. Strength, hardness properties of the aluminium based MMC can be tailored by adjusting shape and amount of the silicon carbide particles.

One application where the MMC has been successfully applied is gun barrels. The use of propellants in guns for firing high energy projectiles in rapid and long burst cycles generate very high flame temperatures, which cause high erosion of conventional steel material. The erosion will limit the lifetime of gun barrels significantly to unacceptably short times. US 2005268517 describe a solution where the inside of a barrel is covered with a ceramic composite liner with metal matrix composite.

Another application is gas exhaust nozzles. Gas exhaust nozzles must withstand high speed gases with very high temperature and pressure gradients and at the same time meet economic, weight and noise goals. The use of an advanced material such as MMC, will reduce weight and extend lifetime of a nozzle component compared to a conventional steel material. In addition to the flow of high-temperature exhaust gases into the gas nozzle, ambient air may in some applications be entrained to reduce gas exit velocities and suppress sound. This will lead to extremely high temperature gradients and, hence, high thermal stresses. Further, exhaust gases are highly oxidizing; material environmental resistance will be an important factor for long life.

A problem, however, in spite of the excellent properties of MMC, is that micro cracks or cavities, after long term high temperature and pressure exposure, will develop in the binder. These micro cracks or cavities cause erosion and loss of binder material in the MMC. As more and more binder are lost, ceramic particles in the binder will, successively, disengage from the binder and strength and wear resistant of the MMC will accordingly decay.

OBJECT OF THE INVENTION AND ITS DISTINCTIVE FEATURES

A first object of the present invention is to provide a method for easy and economic restoring of strength and wear resistant of a metallic matrix ceramic, which metallic matrix ceramic have been exposed to long term high temperature and high pressure exhaust gases, such as in gas exhaust nozzles.

A second object of the present invention is to provide an arrangement for easy and economic restoring of strength and wear resistant of a metallic matrix ceramic.

These objects, as well as other objects not enumerated here, are satisfactorily met within the scope of the features that is specified in the present independent patent claims. Embodiments of the invention are specified in the independent claims.

Thus, according to the present invention, a method for restoring strength and wear resistant of a metallic matrix ceramic comprising a metallic binder and ceramic filler particles, which metallic matrix ceramic has been exposed for long term high temperature and pressure cycling, for example in a gas exhaust nozzle, whereby micro cracks are developed in the outer layer of the metallic binder, has been realized, characterized in that the metallic binder containing micro cracks, partly or fully, is removed from the metallic matrix ceramic by a chemical operation, where after the metallic matrix ceramic is compressed by a compression operation for achieving a dense outer layer, wherein the filler particles are close to each other.

According to further aspects of the method according to the invention:

- the chemical operation is a chemical etching operation, which chemical etching operation comprises the following steps; adding a chemical solvent to the surface for dissolving binder containing micro cracks, adding a neutralisation and cleaning agent for neutralisation and cleaning the outer layer and adding hot air for drying the outer layer,
- the chemical solvent comprises iron chloride acid solution,
- the compression operation is a shoot peening process,
- the chemical and compression operations alternates in a number of cycles, which number of cycles depends on frequency and depth of the micro cracks,
- an intermediate operation is included for adding new binder material to the outer layer for replacing lost binder material,
- the intermediary operation is a sputtering operation.

Furthermore, according to the present invention, an arrangement for restoring of strength and wear resistant of a metallic matrix ceramic comprising a metallic binder and ceramic filler particles, which metallic matrix ceramic has been exposed to long term high temperature and pressure cycling, for example in a gas exhaust nozzle, whereby micro cracks are developed in the outer layer of the metallic binder, has been realized, characterized in that the arrangement comprises; a first multi-hole spray nozzle device for adding a chemical solvent to the outer layer, a second multi-hole spray nozzle device for adding cleaning and neutralisation fluid to the outer layer and a ball blasting nozzle device for compacting the outer layer of the metal matrix ceramic.

According to further aspects of the arrangement according to the invention:

the arrangement also comprises a sputtering device for adding metallic binder materials to the outer layer of the metal matrix ceramic for replacing lost binder material.

ADVANTAGES AND EFFECTS OF THE INVENTION

The invention provides an easy and economic method for restoring strength and wears resistant of a metallic matrix ceramic part, for example in an exhaust nozzle in a recoilless weapon, which exhaust nozzle has been exposed to high temperatures and pressures. The invention provides a method where a MMC part can be restored in the application by using portable recovering devices, without the need of dissembling.

LIST OF FIGURES

Figure 2:
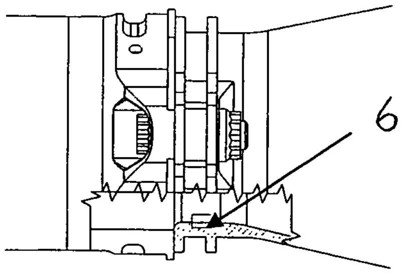
Figure 3:
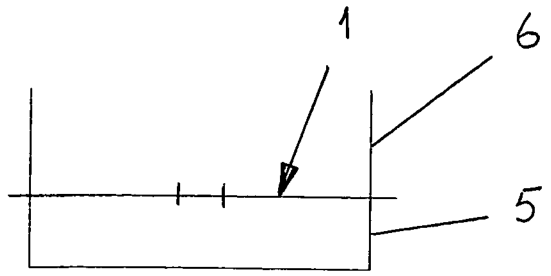
Figure 4:
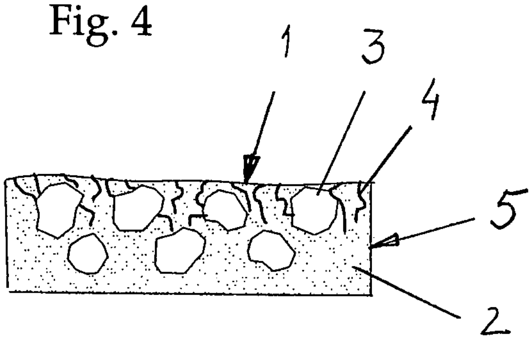
Figure 5:
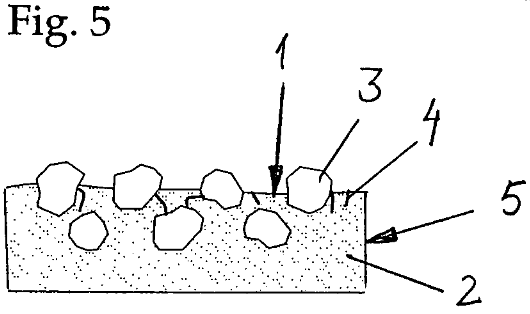

The invention will be described in greater detail below with reference to the appended figures, in which:

FIG. 1 shows a schematic view of a recoilless weapon comprising a gas exhaust nozzle, made of MMC FIG. 2 shows a schematic view of the gas exhaust nozzle in FIG. 1, FIG. 3 shows a schematic view of an outer layer part of the gas exhaust nozzle in FIG. 2, FIG. 4 shows a detailed view of the outer layer of the gas exhaust nozzle in FIG. 3, where micro cracks are displayed in the binder phase, FIG. 5 shows a detailed view of the outer layer of the nozzle in FIG. 4 after the outer layer has been treated with a first etching operation.

Figure 6:
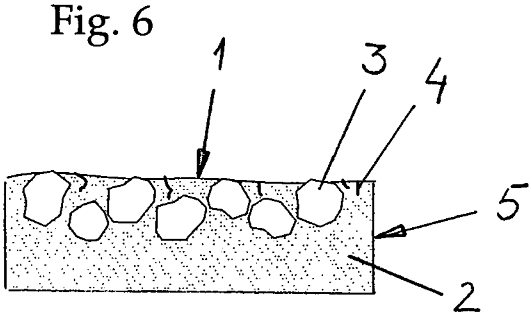
Figure 7:
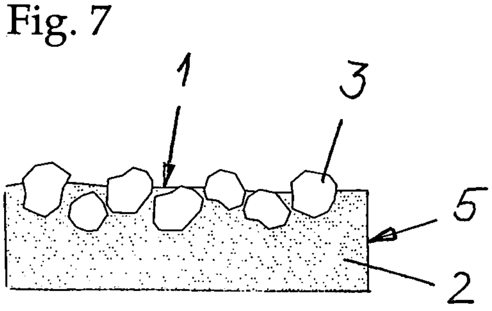
Figure 8:
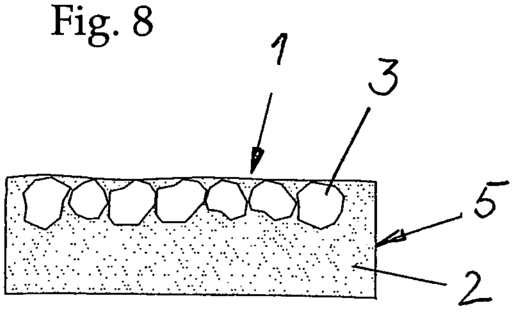

FIG. 6 shows a detailed view of the outer layer of the nozzle in FIG. 5 after the outer layer has been treated with a first shot peening operation FIG. 7 shows a detailed view of the outer layer of the nozzle in FIG. 6 after the outer layer has been treated with a second etching operation FIG. 8 shows a detailed view the outer layer of the nozzle in FIG. 6 after a second shot peening operation.

DETAILED DESCRIPTION OF EMBODIMENTS

FIGS. 4 to 8 shows a method, in accordance with the invention, for restoring strength and wears resistant of a metallic matrix ceramic (MMC) part 1. The MMC part 1 comprises a metallic binder 2 and ceramic filler particles 3, wherein a plurality of micro cracks 4 are developed in an outer layer 5 of the binder 2 due to long term high temperature and pressure cycling. Number and size of the micro cracks 4 depends on to what extent the MMC part 1 has been exposed to high temperature and pressure. Long term exposure in a gas exhaust nozzle 6 of a recoilless weapon 7, FIGS. 1 and 2, will cause a high number of large sized micro cracks 4 in the MMC part 1, mainly located in the outer layer 5 of the MMC part 1, FIG. 3, where temperature and pressure are as highest. Micro cracks 4 cause erosion and loss of binder 2 in the MMC part 1. As more and more binder 2 are lost, ceramic particles 3 in the binder 2, successively, disengaged from the binder 2 and strength and wear resistant of the MMC part 1 will decay accordingly.

The ceramic particles 3 are, preferably, of silicon carbide types. The amount of ceramic particles 3 is, preferably, in the range of 15-70 vol. %.

The metallic binder 2, preferably, consists of aluminium but may contain other metals such as steel or metal alloys.

In a preferred embodiment of the invention, FIGS. 4 to 8, the method comprises two main operations, also denoted as processes; a first operation for removing the part of the outer layer 5 of the metallic binder 2, which contains micro cracks 4, and a second operation for compressing the outer layer 5 of the MMC part 1, such that all superficial ceramic particles 3 are pressed deeper into the outer layer 5 close to each other, for achieving a more dense outer layer 5.

The two main operations may be altered and repeated in a number of ways, where the number is determined by frequency and size of the micro cracks 4. A high frequency and large sized micro cracks 4 require a high number of repetitions, while a low frequency and small sized micro cracks require less repetition.

The removing operation is, preferably, a chemical etching operation, which chemical etching operation comprises the following steps; adding a chemical solvent to the outer layer for dissolving the binder 2 containing all or part of the micro cracks 4, washing the outer layer 5 for neutralisation and cleaning the outer layer 5 from dissolved binder 2 and solvent residues, and finally a drying step for drying the outer layer 5.

The chemical solvent, preferably, comprises an iron chloride acid solution or alternatively a hydro-chloride acid solution, but may also comprise a sulphuric acid solution or a nitric acid solution or mixtures thereof.

The removing operation may, in alternative embodiment, be a sintering operation.

The chemical solvent is, preferably, added to the outer layer 5 by a movable multi-hole spray nozzle device. The spray nozzle device comprises a multi-hole spray nozzle part attached to a fluid pipe. The opposite end of the fluid pipe is connected to a fluid container containing a fluid, whereby the spray nozzle is in fluid contact with the fluid container. The fluid container is pressurized with an inert gas and connected to a fluid valve in order to facilitate regulation of the fluid pressure to the spray nozzle part.

The fluid container may contain different types of fluid, such as a chemical solvent to carry out the dissolving operation of the binder 2, or a neutralisation and cleaning fluid to carry out the neutralisation and cleaning operation. Alternatively two different containers, containing chemical solvent and neutralisation and cleaning fluids respectively, may be alternated.

The drying operation is, preferably, carried out by using a hot air blowing device. The hot air blowing device may be arranged similar to a hairdryer. Alternatively, the multi-hole spray nozzle may be arranged such that it can be used for blowing hot air, as well.

Compressing the outer layer of the MMC part 1 may be done by different techniques, such as rolling, pressing or shot peening. In the preferred embodiment of the invention, shot peening is the preferred technique. Shot peening is a well-known technique for use in different applications, especially in aircraft repairs to produce a compressive residual-stress surface and modify mechanical properties of metal based composite materials.

It entails impacting a surface part with shot (round metallic, glass or ceramic particles) with force sufficient to create plastic deformation, each particle functions as a ball-peen-hammer. Depending on the part constitutes geometry, part material, shot material, shot quality, shot intensity, shot coverage, shot peening can increase fatigue life substantially. The shot peening device is arranged in a similar way as the multi-hole spray nozzle.

FIG. 5 shows the outer layer 5 of the MMC 1 after a part of the metallic binder 2, comprising micro cracks 4, has been removed, preferably by chemical etching, and after the outer layer 5 has been cleaned and dried. FIG. 6 shows the outer layer 5 in FIG. 5 after compaction FIG. 7 and FIG. 8 shows the outer layer 5 after the operations, shown in FIGS. 5 and 6, has repeated once more and all metallic binder 2 containing micro cracks 4 has been removed.

In a second embodiment, not shown, the method also include an intermediate operation, wherein new binder material 2 is added to the outer layer 5 for replacing lost binder material in the metallic matrix ceramic 1. The new binder material 2 is, preferably, added by a sputtering operation. Sputter deposition is a physical vapour deposition method of depositing thin films by sputtering, ejecting material from a target source, which then deposits onto a substrate, e.g., the outer layer of the MMC part 1. As sputtering techniques are well known in state of the art, no further explanation will be given here.

The invention is not limited to the above described illustrative embodiments, but rather a number of alternative embodiments are accommodated within the scope of the appended patent claims.

Thus, the operations described herein, including adding new binder material, for recovering strength and wear resistance may combined differently and in various number. The scope of the invention is primarily to perform and combine said operations in regard to the loss of strength and wear properties of a MMC part.

The invention claimed is:

1. A method for restoring strength and wear resistant of a metallic matrix ceramic comprising a metallic binder and ceramic filler particles, which metallic matrix ceramic has been exposed to temperature and pressure cycling in a gas exhaust nozzle, whereby micro cracks are developed in the outer layer of the metallic binder wherein the metallic binder containing micro cracks, partly or fully, is removed from the metallic matrix ceramic by chemical etching operation, wherein the chemical etching operation comprises adding a chemical solvent comprising an iron chloride acid solution, wherein the chemical solvent is added by a movable multi-hole spray nozzle device to the outer layer for dissolving binder containing micro cracks, washing the outer layer for neutralization and cleaning the outer layer from dissolved binder and solvent residues and then drying the outer layer, where after the chemical etching operation a new binder material is added by sputtering to the outer layer for replacing lost binder material in the metallic matrix ceramic, and where after the new binder is added, the metallic matrix ceramic is compressed by a shot peening operation for achieving a dense outer layer, wherein the ceramic filler particles are close to each other, and wherein the chemical etching operations and the shot peening operation alternate and are repeated for a plurality of cycles, which depends on the frequency and the depth of the micro cracks.

2. The method according to claim 1, wherein the ceramic filler particles comprise silicon carbide.

3. The method according to claim 2, wherein the amount of the ceramic filler particles is 15-70 vol. %.

4. The method according to claim 3, wherein the metallic binder comprises aluminum or steel.

5. The method according to claim 1, wherein the movable multi-hole spray nozzle device comprises a multi-hole spray nozzle part attached to a fluid pipe, wherein the opposite end of the fluid pipe is connected to a fluid container containing a fluid.

6. The method according to claim 1, wherein the amount of the ceramic filler particles is 15-70 vol. %.

7. The method according to claim 1, wherein the metallic binder comprises aluminum or steel.

* * * * *